(12) United States Patent
Starsinic et al.

(10) Patent No.: US 12,520,150 B2
(45) Date of Patent: Jan. 6, 2026

(54) 3GPP PRIVATE LANs

(71) Applicant: InterDigital Patent Holdings, Inc., Wilmington, DE (US)

(72) Inventors: Michael F. Starsinic, Newtown, PA (US); Rocco Di Girolamo, Laval (CA); Catalina Mihaela Mladin, Hatboro, PA (US); Hongkun Li, Malvern, PA (US); Qing Li, Princeton Junction, NJ (US); Quang Ly, North Wales, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 486 days.

(21) Appl. No.: 17/279,682

(22) PCT Filed: Sep. 24, 2019

(86) PCT No.: PCT/US2019/052619
§ 371 (c)(1),
(2) Date: Mar. 25, 2021

(87) PCT Pub. No.: WO2020/068765
PCT Pub. Date: Apr. 2, 2020

(65) Prior Publication Data
US 2021/0400489 A1    Dec. 23, 2021

Related U.S. Application Data

(60) Provisional application No. 62/737,276, filed on Sep. 27, 2018.

(51) Int. Cl.
*H04W 12/086*    (2021.01)
*H04W 4/50*    (2018.01)
(Continued)

(52) U.S. Cl.
CPC ......... *H04W 12/086* (2021.01); *H04W 4/50* (2018.02); *H04W 36/00226* (2023.05); *H04W 48/14* (2013.01); *H04W 60/04* (2013.01)

(58) Field of Classification Search
CPC ... H04W 8/06; H04W 24/08; H04W 36/0027; H04W 36/0069; H04W 48/12;
(Continued)

(56) References Cited

U.S. PATENT DOCUMENTS 8,695,077 B1 * 4/2014 Gerhard ............. H04L 63/0815
726/8
9,871,778 B1   1/2018 Taralika et al.
(Continued)

FOREIGN PATENT DOCUMENTS

CN    107113698 A    8/2017
CN    107409137 A    11/2017
(Continued)

OTHER PUBLICATIONS

3rd Generation Partnership Project; Technical Specification Group Services and System Aspects; Study on the security aspects of the next generation system (Release 14), ETSI Draft; LI(17) R41001R1, European Telecommunications Standards Institute (ETSI), 650, Route Des Lucioles ; F-06921 Sophia-Antipolis ; France, [Online] vol. TC-LI—Lawful Interception, Aug. 30, 2017, pp. 1-605, XP014298841.
(Continued)

*Primary Examiner* — Dustin Nguyen
(74) *Attorney, Agent, or Firm* — Mark D. Pratt

(57) ABSTRACT

Methods and apparatuses are described herein for securely connecting to a private local area network (LAN). In accordance with one embodiment, an apparatus may receive, from a private LAN that has been provisioned with first identifying information associated with the apparatus, a first
(Continued)

broadcast message comprising an invitation to connect to the private LAN and the first identifying information. The apparatus may send, based on the first broadcast message comprising the first identifying information, a request for system information and second identifying information associated with the apparatus. The apparatus may receive, from the private LAN, the requested system information. The apparatus may send, based on the requested system information, a registration request and third identifying information associated with the apparatus. The apparatus may receive, from the private LAN, acceptance of the registration request.

12 Claims, 11 Drawing Sheets

(51) Int. Cl.
*H04W 36/00* (2009.01)
*H04W 48/14* (2009.01)
*H04W 60/04* (2009.01)

(58) Field of Classification Search
CPC ..... H04W 88/10; H04W 12/06; H04W 48/18; H04W 68/02; H04L 5/0035; H04L 67/52; H04L 63/10; H04L 63/0815; H04L 65/1104
See application file for complete search history.

(56) References Cited

U.S. PATENT DOCUMENTS

| | | | |
|---|---|---|---|
| 2008/0270618 A1* | 10/2008 | Rosenberg | H04L 65/1104 709/228 |
| 2009/0104905 A1 | 4/2009 | Digirolamo et al. | |
| 2009/0239533 A1 | 9/2009 | Somasundaram et al. | |
| 2011/0103265 A1* | 5/2011 | Dilipkumar Saklikar | H04L 63/0815 370/352 |
| 2012/0047558 A1* | 2/2012 | Sundaram | H04L 63/10 726/3 |
| 2015/0043429 A1* | 2/2015 | Kim | H04L 67/52 370/328 |
| 2015/0281966 A1* | 10/2015 | Griot | H04W 12/06 726/5 |
| 2015/0282042 A1* | 10/2015 | Griot | H04W 24/08 370/329 |
| 2016/0183169 A1 | 6/2016 | Horn et al. | |
| 2016/0277927 A1 | 9/2016 | Lee et al. | |
| 2017/0034767 A1* | 2/2017 | Griot | H04W 48/12 |
| 2017/0357528 A1 | 12/2017 | Puranik et al. | |
| 2018/0199308 A1* | 7/2018 | Liu | H04W 68/02 |
| 2018/0227873 A1 | 8/2018 | Vrzic et al. | |
| 2019/0014515 A1* | 1/2019 | Zee | H04W 36/0027 |
| 2019/0098596 A1* | 3/2019 | Basu Mallick | H04W 36/0069 |
| 2019/0182718 A1* | 6/2019 | Shan | H04W 8/06 |
| 2019/0215214 A1* | 7/2019 | Kim | H04L 5/0035 |
| 2019/0380128 A1* | 12/2019 | Park | H04W 88/10 |
| 2022/0095276 A1* | 3/2022 | Aiba | H04W 48/18 |

FOREIGN PATENT DOCUMENTS

| | | |
|---|---|---|
| JP | 2010-541428 A | 12/2010 |
| JP | 2011-518471 A | 6/2011 |
| JP | 2017-511649 A | 4/2017 |
| JP | 2018-522494 A | 8/2018 |
| WO | 2017/173259 A1 | 10/2017 |

OTHER PUBLICATIONS

Multefire Alliance: MulteFire Release 1.0 Technical Paper, Jul. 11, 2017, XP055409140, Retrieved from the Internet: URL:https://www.multefire.org/wp-content/uploads/MulteFire-Release-1.0-whitepaper FINAL.pdf—[retrieved on Sep. 22, 2017] p. 6-p. 13.
Qualcomm Incorporated et al: Key Issue on restricted connectivity for remote provisioning of IoT UEs, 3GPP Draft; S2-182280 Remote Provisioning, 3rd Generation Partnership Project (3GPP), Mobile Competence Centre; 650, Route Des Lucioles ; F-06921 Sophia-Antipolis Cedex ; France, [Online] vol. SA WG2, No. Montreal, Canada; Feb. 26, 2018-Mar. 2, 2018, Feb. 20, 2018, pp. 1-3, XP051408799.
3rd Generation Partnership Project; Technical Specification Group Services and System Aspects; Study on 5GS Enhanced support of Vertical and LAN Services (Release 16), "23734-020-MCCclea n" 3GPP TR 23.734 V0.2.0, 2018, pp. 39.
3rd Generation Partnership Project; Technical Specification Group Services and System Aspects; Procedures for the 5G System; Stage 2 (Release 15), 3GPP TS 23.502 V15.1.0 (Mar. 2018), 285 pages.
"3rd Generation Partnership Project; Technical Specification Group Services and System Aspects; Feasibility Study on LAN Support in 5G (Release 16)", 3rd Generation Partnership Project, Document: 3GPP TR 22.821 V16.1.0 (Jun. 2018), Jun. 2018, 52 pages.
SA WG2, "New SID: 5GS Enhanced support of Vertical and LAN Services", Doc. SP-180507, TSG SA Meeting #SP-80, Jun. 13-15, 2018, La Jolla, California, USA, 4 pages.
Third Generation Partnership Project, "Technical Specification Group Radio Access Network; NR; Radio Resource Control (RRC) protocol specification (Release 15)," 3GPP TS 38.331 V15.1.0 (Mar. 2018), 268 pages.
Qualcomm Incorporated, et al., "Definitions, architectural assumptions and key issue related to network identification, selection and access control (solution)", Doc. S2-187549 (was S2-18xxyy), SA WG2 Meeting #128, Jul. 2-6, 2018, Vilnius, Lithuania, 2 pages.
3GPP TR 22.804, Technical Specification Group Services and System Aspects; Study on Communication for Automation in Vertical Domains (Release 16), V16.2.0, 2018, 196 pages.
ETSI TS 133 501 V15.1.0 (Jul. 2018), "5G; Security architecture and procedures for 5G system," (3GPP TS 33.501 version 15.1.0 Release 15), Jul. 31, 2018, 150 pages.

* cited by examiner

3GPP PRIVATE LANs

CROSS-REFERENCE TO RELATED APPLICATIONS

This application is the National Stage Application of International Patent Application No. PCT/US2019/052619 filed Sep. 24, 2019 which claims the benefit of U.S. Provisional Patent Application No. 62/737,276, filed Sep. 27, 2018, which is hereby incorporated by reference in its entirety.

BACKGROUND

When devices with wireless communications capabilities are packaged, the device manufacturer has no way of knowing with which network information the devices need to be provisioned, and therefore these devices need to be configured after initial purchase. Further, it may be considered a security risk to have a private network's (R)AN node broadcast network identifiers, and it adds unnecessary overhead if this information is periodically broadcast by the (R)AN node. A (R)AN node may provide connectivity to both a private LAN and the public cellular network, yet it is not currently possible for a UE to have two non-access stratum (NAS) connections through the same (R)AN node.

Accordingly, there is a need for enhanced methods and apparatuses for securely connecting to 3GPP private networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for securely connecting to a private local area network (LAN). In accordance with one embodiment, an apparatus may receive, from a private LAN that has been provisioned with first identifying information associated with the apparatus, a first broadcast message comprising an invitation to connect to the private LAN and the first identifying information. The apparatus may send, based on the first broadcast message comprising the first identifying information, a first message comprising a request for system information and second identifying information associated with the apparatus. The apparatus may receive, from the private LAN, a second broadcast message comprising the requested system information. The apparatus may send, based on the requested system information, a second message comprising a registration request and third identifying information associated with the apparatus. The apparatus may receive, from the private LAN, a third message indicating acceptance of the registration request.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
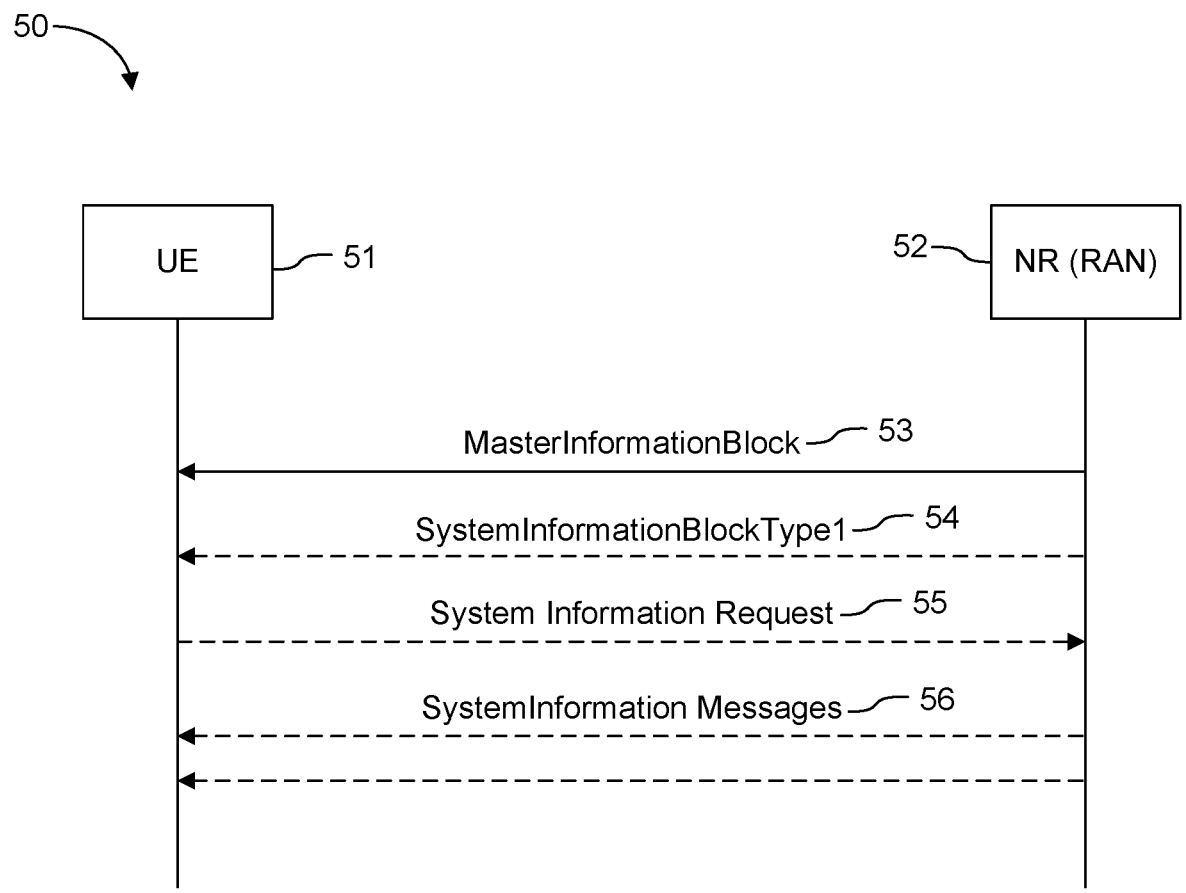
FIG. 1 is a diagram of an example procedure for system information acquisition.

3rd Generation Partnership Project (3GPP) networks are providing local area network (LAN) like services to subscribers using networks referred to as 3GPP LANs, which may also be referred to herein as private LANs. Methods and apparatuses are described herein to allow devices, which have no pre-provisioned network credentials, to securely connect to a 3GPP LAN. The network may use provisioned information to broadcast an invitation for select devices to connect to the network. The device may receive the invitation and request that the network broadcast additional information so that the device can determine if it is the intended recipient of the invitation. The request includes information that the network can use to identify the device. Once the device is provisioned with network credentials, the credentials can be used to discover LANs, identify LANs as candidates for connectivity, and provide (R)AN nodes with credentials that are used to request that the network broadcast network identifiers.

For example, radio access network (RAN) nodes may broadcast only partial identifying information. When a device detects a (R)AN node that is broadcasting partial identifying information that corresponds to a network that it wants to associate with, it may decide to send a request to the (R)AN node to broadcast more information about the network. The request may include an invitation tag that helps to prove to the (R)AN node that the device is permitted to associate with the network.

As used herein the term, type-a network refers to a 3GPP local area network (LAN) that is not for public use and for which service continuity and roaming with a Public Land Mobile Network (PLMN) is possible.

As used herein the term, type-b network refers to an isolated 3GPP network that does not interact with a PLMN.

A PLMN Identifier is used to identify 3GPP mobile networks. A PLMN ID may also be used to identify private networks such as LANs.

The embodiments described herein refer to various actions that a device, such as for example a user equipment (UE), may perform. The terms device and UE may be used interchangeably herein. A UE may have one or more packet data network (PDN) connections. In 5G systems, a PDN connection may also referred to as a protocol data unit (PDU) session.

As used herein the terms, LAN or private LAN, refers to a 3GPP LAN.

A type-a network or type-b network may also be referred to as a non-public network.

A type-b network may also be referred to as a standalone non-public network.

The Table 1 below provides a list of acronyms relating to technologies that may be used in the examples described herein:

TABLE 1

Acronyms

| | |
|---|---|
| AF | Application Function |
| AMF | Access and Mobility Function |
| AP | Access Point |
| API | Application Programming Interface |
| EAP | Extensible Authentication Protocol |
| GUAMI | Globally Unique AMF Identifier |
| MCC | Mobile Country Code |
| MIB | Master Information Block |
| MNC | Mobile Network Code |
| NAS | Non-Access Stratum |
| NEF | Network Exposure Function |
| NSSAI | Network Slice Selection Assistance Information |
| OTT | Over The Top |
| PCF | Policy and Charging Function |
| PDU | Protocol Data Unit |
| PEI | Permanent Equipment Identifier |
| PLMN | Public Land Mobile Network |
| (R)AN | Radio Access Network |
| S-RAN | Source Radio Access Network |
| S-NSSAI | Single NSSAI |
| SIB | System Information Block |
| SMF | Session Management Function |
| SD | Slice Differentiator |
| SSID | Service Set Identifier |
| SST | Slice/Service Type |
| SUCI | Subscription Concealed Identifier |
| T-RAN | Target Radio Access Network |
| UDR | User Data Repository |
| UPF | User Plane Function |
| 5G-GUTI | 5G Globally Unique Temporary Identifier |
| 5G-S-TMSI | 5G SAE-Temporary Mobile Subscriber Identity |
| 5G-TMSI | 5G Temporary Mobile Subscriber Identity |

The embodiments described herein may apply various use cases. One example use case includes device management and onboarding. For example, a factory worker may be installing new devices (for example, sensors, actuators, and controllers) in a factory. In this example, the factory may own and deploy a private network using 3GPP technology, and may serve as the network operator. The devices in this example need to be able to connect to the network and securely communicate. However, the devices may not come with pre-provisioned credentials. The embodiments described herein support secure mechanisms for an operator to provision 3GPP credentials to industrial IoT devices for 5G LAN-type services.

Another example use case is related to device discovery mechanisms. For example, a user may browse the internet with a tablet and attempt to print out an article. Initially, the printer is not be plugged in, and as a result, the tablet does not discover a printer. The user plugs in the printer, and the tablet subsequently discovers the printer, and the article can be sent to the printer. The embodiments described herein support LAN discovery mechanisms.

Another example use case includes when a technician's UE has an app that is designed to communicate with an application that is hosted on a UE that is embedded in a piece of equipment. The equipment is not always reachable, so the application on the technician's UE needs to be able to determine when the UE in the equipment is reachable. The embodiments described herein support, based on operator policy and user permission, enabling a UE to be aware of whether or not a specific UE in the same 5G LAN set is available for communication, regardless of whether they are roaming.

In another example, a local operator may want to operate a device in their vicinity rather than go through a list of many (potentially thousands) of devices installed at the plant. The embodiments described herein support the automated discovery of 5G devices belonging to a certain group such as those in a plant in the immediate vicinity of a user (for example, within a certain radius) and provide the user with a list of all detected 5G devices. For example, a service technician, without prior knowledge of the plant, may want to connect to a certain device within their vicinity. However, the device may not be directly accessible due obstacles in the plant. The device may be easily discoverable using automated discovery as described herein.

Another example use case includes a plug and produce feature for field devices in which the 5G system allows devices to easily connect to 5G system. For example, constrained devices (such as battery-driven field devices) may not be delivered with preconfigured over-the-top (OTT) application layer security. The embodiments described herein provide network layer security and perform authentication based on a a set of authentication credentials.

Another example use case includes type-a network—PLMN interaction in which UEs communicate simultaneously over the PLMN as well as within the type-a network including service continuity when the UE moves from the PLMN to the type-a network. For example, a UE may be handed over from the PLMN to a factory type-a network when within its range. The embodiments described herein support various handover scenarios.

The embodiments described herein may apply various enhancements made to the 5G system to support a 5G LAN service. Examples of these enhancements include enhancements to service exposure via application programming interfaces (APIs) for third party use of functionalities (e.g. for information regarding the geographic location of coverage area of a type-a/type-b network); support for type-b networks; support for UEs being registered in both a type-b network and a PLMN when the UE supports credentials required for the type-b network and credentials required for a PLMN and is able to maintain both registrations independently; support for type-a networks and interworking, roaming between public and type-a networks; and support for roaming, mobility and service continuity between PLMNs and type-a networks (e.g. for mobility from a type-a network to a PLMN) with direct interaction between the type-a networks and PLMN.

A type-a network may be uniquely identified by the combination of a PLMN identifier and a type-a network identifier (TA-NID). The UE may be assumed to be configured with one or multiple tuples consisting of PLMN identifier and TA-NID corresponding to the type-a networks with which the UE is authorized to register. Next generation radio access network (NG-RAN) nodes supporting access to type-a networks may broadcast one or more tuples consisting of PLMN identifier and a TA-NID to indicate to UEs which type-a networks are supported.

A type-b network may be identified by a type-b network identifier (TB-NID). In a given region, TB-NIDs may be centrally managed and assigned (and hence considered unique in that region) or may be assigned by individual type-b network operators (i.e. unmanaged and hence not unique). Both allocation strategies may exist in the same region. The UE is assumed to be configured with the TB-NIDs corresponding to the type-b networks with which the UE is authorized to register.

NG-RAN nodes supporting access to type-b networks may broadcast one or more TB-NIDs to indicate to the UEs the type-b networks that they support. A UE may automatically select and attempt to register with type-a and type-b networks that the UE is authorized and for which it is configured.

The 5G Globally Unique Temporary Identifier (5G-GUTI) may be structured as:

<5G-GUTI>:=<GUAMI> <5G-TMSI> where GUAMI identifies the assigned access and mobility function (AMF) and 5G temporary mobile subscriber identity (5G-TMSI) identifies the UE uniquely within the AMF.

The Globally Unique AMF ID (GUAMI) may be structured as:

<GUAMI>:=<MCC> <MNC> <AMF Region ID> <AMF Set ID> <AMF Pointer> where AMF Region ID identifies the region, AMF Set ID uniquely identifies the AMF set within the AMF Region, and AMF Pointer uniquely identifies the AMF within the AMF Set. The AMF Region ID addresses the case that there are more AMFs in the network than the number of AMFs that can be supported by AMF Set ID and AMF Pointer by enabling operators to re-use the same AMF Set IDs and AMF Pointers in different regions.

The 5G-S-TMSI may be the shortened form of the GUTI to enable more efficient radio signaling procedures (e.g., during a Paging and Service Request) and may be defined as:

<5G-S-TMSI>:=<AMF Set ID> <AMF Pointer> <5G-TMSI>

When a UE sends a Registration Request to a (R)AN node, the message may include an AN Parameters field that may be used by the (R)AN node to help guide it in selecting an AMF. The AN Parameters field may include a subscription concealed identifier (SUCI), or 5G globally unique temporary identifier (5G-GUTI), a PLMN ID, and network slice selection assistance information (NSSAI).

Handover procedures between a 3GPP access network are used to handover a UE from a source radio access network (S-RAN) node to a target RAN (T-RAN) node. A first type may be based on the availability of an Xn interface between the S-RAN node and T-RAN node. When the Xn interface is not available, an N2 based handover may be performed where the S-RAN node communicates the handover request to the target network via the source AMF. Handover between 3GPP access networks may be initiated by the RAN.

FIG. 1 is a diagram of an example procedure 50 for system information acquisition. In this example, UE 51 may acquire system information from an NR (R)AN node 52. The MasterinformationBlock (MIB) is always transmitted by the (R)AN node 52 and contains information that the UE 51 uses to obtain SIB1 (step 53). The SystemInformationBlockType1 (SIB1) is transmitted with a periodicity and contains information such as scheduling information and availability information of other SIBs (step 54). The System Information Request (SI Request) may be used by the UE 51 to request that the (R)AN node 52 broadcast a particular SIB (step 55), and (R)AN node 52 then transmits SystemInformation messages (step 56).

In a factory automation scenario or a plug and produce scenario as described above, devices (e.g., sensors, actuators, and controllers) need to be provisioned to know with which TA-NID (or TB-NID) to associate. This may be an issue in scenarios where the devices are purchased in an "off the shelf" manner. When devices are packaged, the device manufacturer may have no way of knowing with which TA-NID (or TB-NID) the devices need to be provisioned. Thus, the devices, which often do not have a user interface, need to be configured with the TA-NID after initial purchase. Additionally, devices may need to be provisioned with a subscription or certificate that may be used to access the network.

Once a UE decides to connect to a TA-NID or TB-NID, the UE needs to discover a RAN node that can provide connectivity to an identified network. A potential solution is to have the RAN node broadcast the TA-NIDs or TB-NIDs to which it can provide access. However, this type of solution might be undesirable; it may be considered a security risk to have the RAN node broadcast TA-NIDs or TB-NIDs. Further, periodically broadcasting the TA-NIDs or TB-NIDs by the RAN node may add unnecessary overhead.

As described above, a UE needs to be able to connect to a PLMN and a type-a network at the same time. When the same RAN node is used to connect to both the PLMN and the type-a network, it requires that the UE have two NAS connections, one NAS connection to an AMF in each network.

As described above, upon connecting to the network, devices must be able to discover and establish communication with other devices in the LAN, and the network should be able to limit what devices are discoverable by a given device. For security and signaling efficiency purposes, it is important that the network be able to efficiently limit which devices can be discovered by a given device. Further, it may not be desirable to allow a device to see certain other devices within the network, and it is not necessary to allow devices to discover devices with which they are not allowed to establish a communication session.

As described above, service continuity may be required between a PLMN and type-a network. Thus, the network may need to redirect the UE between a PLMN and a type-a network (or the UE may determine that it needs to move between the type-a network and the PLMN) and provide service continuity between a type-a network and a PLMN including enabling a UE to identify which PDU sessions need to support service continuity when moving between a type-a network and a wide area network.

Figure 2:
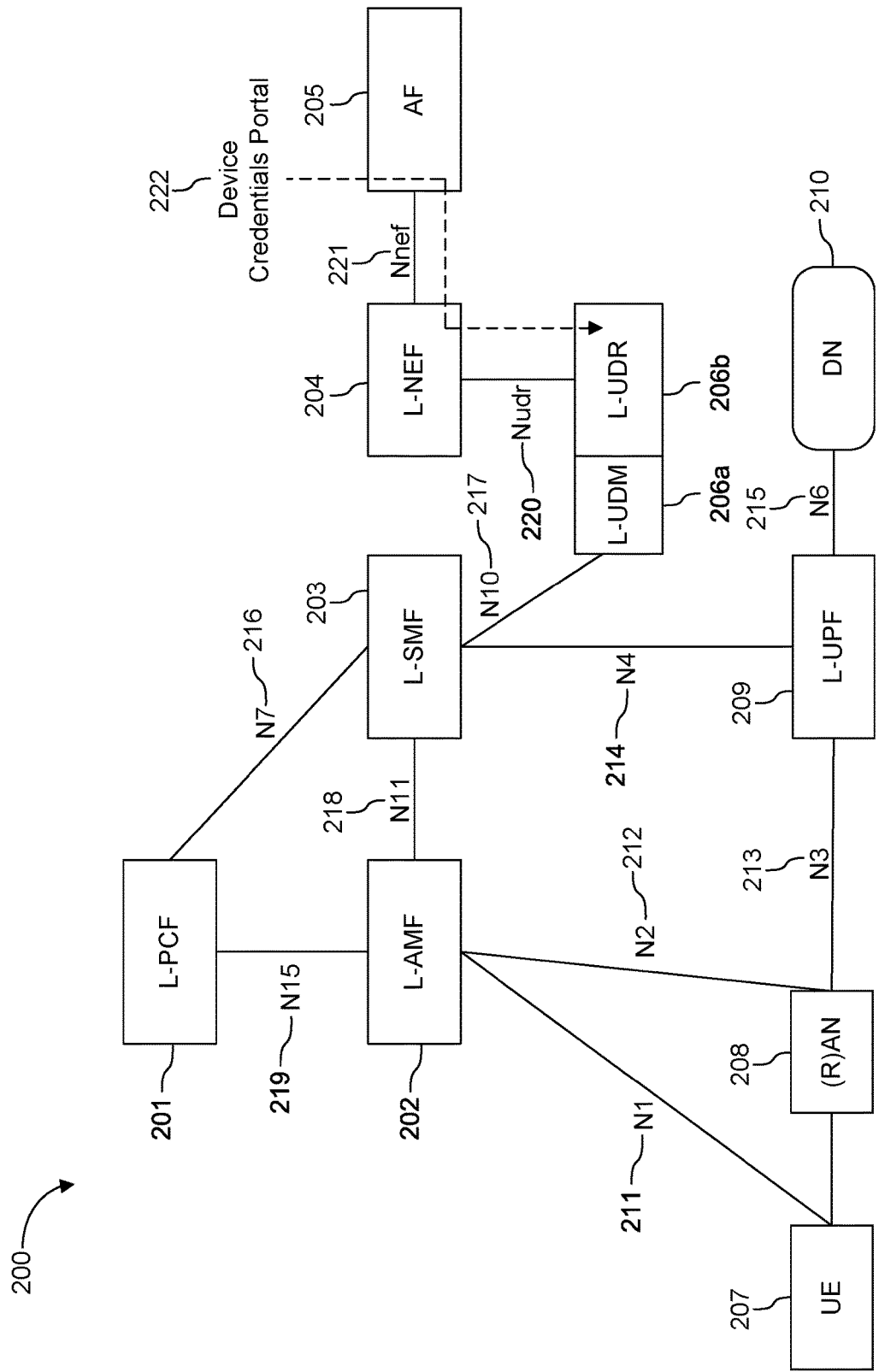
FIG. 2 is a diagram of a LAN system with a device credential panel in accordance with one example.
Figure 3:
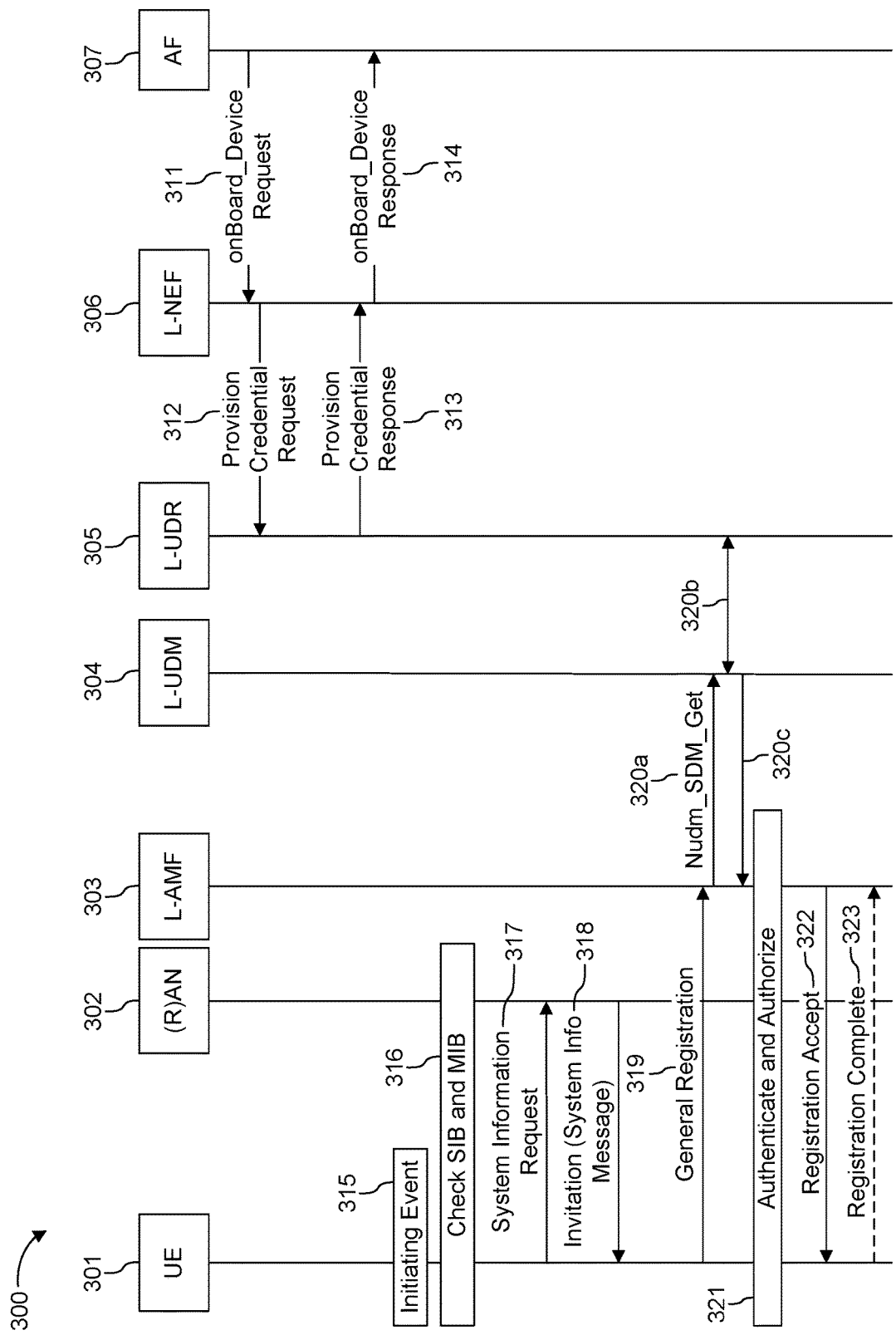
FIG. 3 is a diagram of an example procedure for device onboarding to a type-b network in accordance with one example.
Figure 4:
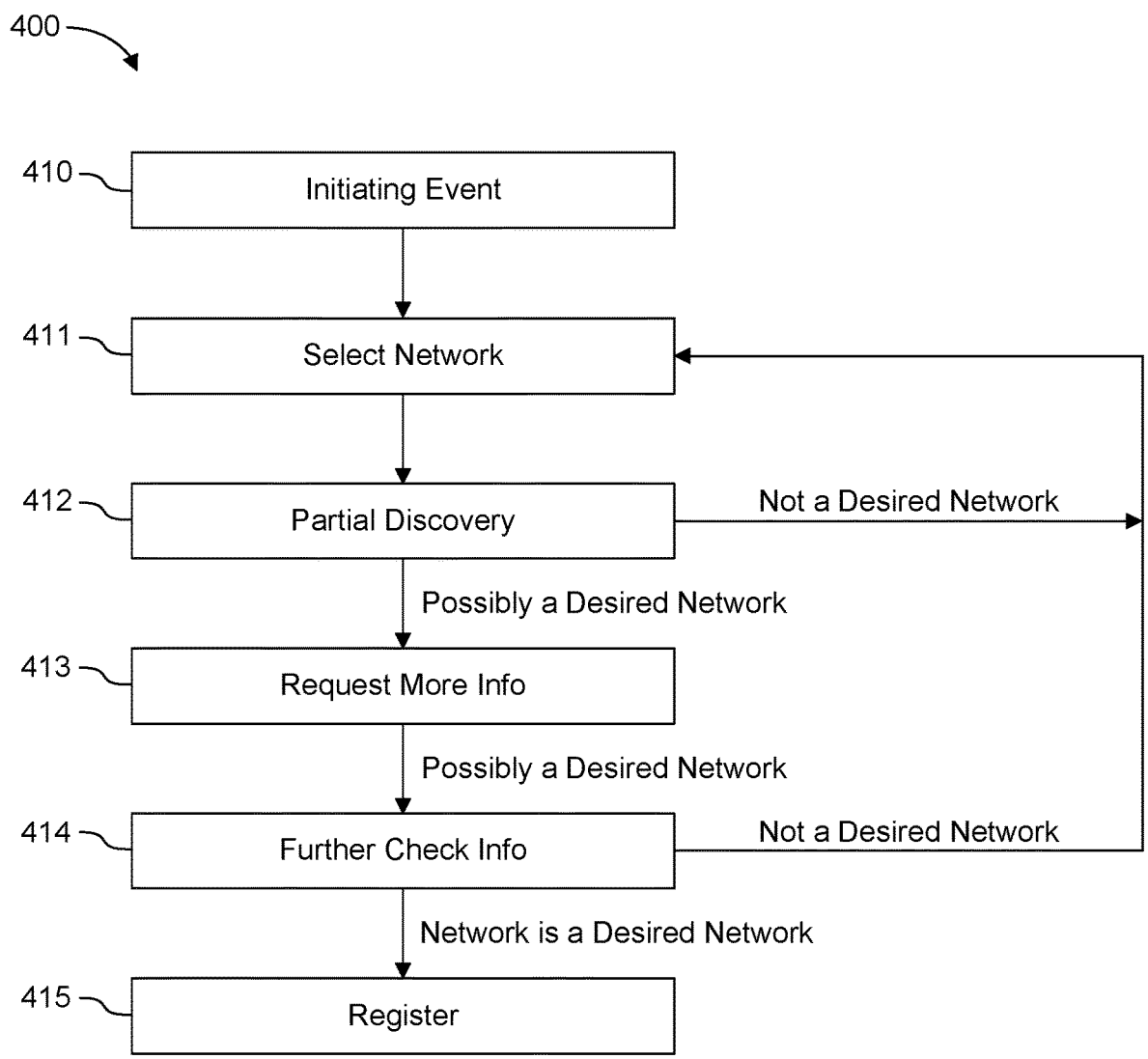
FIG. 4 is a diagram of an example procedure for network discovery in accordance with an example.

FIGS. 2 to 4 (described hereinafter) illustrate various embodiments associated with 3GPP private LANs that enhance 5G networks to address the use cases described above. In these figures, various steps or operations are shown being performed by one or more nodes, apparatuses, devices, servers, functions, or networks. For example, the apparatuses may operate singly or in combination with each other to effect the methods described herein. As used herein, the terms apparatus, network apparatus, node, server, device, entity, network function, and network node may be used interchangeably. It is understood that the nodes, devices, servers, functions, or networks illustrated in these figures may represent logical entities in a communication network and may be implemented in the form of software (e.g., computer-executable instructions) stored in a memory of, and executing on a processor of, a node of such network, which may comprise one of the architectures illustrated in FIGS. 5A or 5B described below. That is, the methods illustrated in FIGS. 2 to 4 may be implemented in the form of software (e.g., computer-executable instructions) stored in a memory of a network node, such as, for example, the node or computer system illustrated in FIGS. 5C or 5D, which may store computer-executable instructions, when executed by a processor of the node, that perform the steps illustrated in the figures and described herein. It is also understood that any transmitting and receiving steps illustrated in these figures may be performed by communication circuitry (e.g., circuitry 34 or 97 of FIGS. 5C and 5D, respectively) of the node under control of the processor of the node and the computer-executable instructions (e.g., software) that it executes. It is further understood that the nodes, devices, and functions described herein may be implemented as virtualized network functions.

Methods and apparatuses are described herein for causing devices, which have no pre-provisioned network credentials, to securely connect to a LAN. In accordance with one embodiment, devices, which have been provisioned with no local area network credentials at the time of manufacturing, may detect or discover a LAN, may review an invitation to connect to the LAN, may request to connect to the network, may determine if it is a network that the device is supposed to connect to and then, upon learning that it is the correct network, may receive network credentials. The LAN operator may use an API that is exposed by a network exposure function (NEF) to provision the network with information about the device that is permitted to connect to the network. The network may use the provisioned information to broadcast an invitation for the device to connect to the network. The device may receive the invitation and request that the network broadcast additional information so that the device can determine if it is the intended recipient of the invitation. Once the device confirms that it is the intended recipient of the invitation, it may attempt to register with the network, and the network may use the device information that was provisioned by the network operator to authenticate and authorize the device. The device may then be provisioned with network credentials.

In accordance with another embodiment, a system may permit a device, which has been provisioned with LAN credentials, to discover a LAN without requiring the RAN node(s) of the LAN to continuously broadcast network identifying information. This allows the UE to use broadcast information to detect that a nearby RAN node might provide access to a LAN that to which it wants to connect. The (R)AN node may broadcast partial identifying information (e.g., combinations of MCC, MNC, Service Identifiers, Operator Identifiers, Network Identifiers, a number, etc.). When the UE detects a RAN node that is broadcasting partial identifying information that corresponds to a network that it wants to associate with, it may decide to send a request to the (R)AN node to broadcast additional information about the network. The request may include an invitation tag that helps to prove to the (R)AN node that the UE is permitted to associate with the network. Once the UE determines that it might want to connect to LAN, the UE may present the RAN node with an identifier that indicates that it was previously invited to connect to the LAN. Upon receiving the identifier, the RAN node may broadcast the remaining portions of the identifying information such as its network identifier.

In accordance with another embodiment, a network operator may deploy both a traditional 5G wide area cellular network and a local area network. The network operator's RAN node(s) (or a subset of the RAN node(s)) may provide connectivity to both the traditional 5G wide area network and one or more LANs. A device may connect to both the 5G wide area cellular network and a local area network via the same RAN node. The device may connect to two AMFs via the same RAN node: one AMF that is associated with the LAN and a second AMF that is associated with the traditional 5G wide area cellular network. Alternatively or additionally, a device may send a request to establish two separate connections to a same AMF via a same RAN node. The UE may indicate to the network that two separate connections are necessary so that the UE can connect to the wide area cellular network and the LAN. When establishing the second connection, the UE may provide the RAN node with the 5G-GUTI or SUCI that is associated with the first connection.

In accordance with another embodiment, a device may be provisioned with polices so that it is aware of the types of devices that it is allowed to discover and with which it may communicate, which may enable the discovery process to be made more efficient. The policies may also assist in preventing the device from attempting to discover devices that it is not allowed to discover or with which it is not permitted to communicate. The device may filter discovery requests that are received on its user interface, thus limiting its requests to the network to requests that the policies indicate are acceptable.

In accordance with another embodiment, existing handover procedures may be enhanced to enable the movement of PDN connections from a wide are cellular network to a LAN (or vice versa). For example, a device may have multiple PDN connections with a wide are cellular network, and it may need to move one or more PDN connections to a LAN (or vice versa), which may be triggered by the device moving into range of the LAN. In another example, an N2-Based handover procedure may enable for handover of select PDU sessions. This procedure may allow the device to indicate to the RAN whether certain PDU sessions should only be served by certain networks. The RAN may then use this information to determine which PDU sessions should be handed over and to inform the AMF of which PDU sessions should be handed over.

FIG. 2 is a diagram of a LAN system 200 with a device credential panel in accordance with one example, which may be used in combination with any of the embodiments described herein. The LAN system 200 may be used when devices such as factory automation, home automation and home security devices that have no pre-provisioned credentials, are to be on boarded to the LAN, which for example may comprise a type-b network. In the example LAN system 200 of FIG. 2, devices, which may not have been provisioned with LAN credentials at the time of manufacturing, may detect the LAN, review an invitation to connect to the LAN, request to connect to the LAN, determine whether it is a LAN to which it is supposed to connect, and upon learning that it is the correct network, receive network credentials.

As shown in the example of FIG. 2, UE 207 has access, via radio access network ((R)AN) 208, to the access and mobility management function (AMF) of the LAN (L-AMF 202) over the N1 interface 211. (R)AN 208 has access to L-AMF 202 via the N2 interface 212. (R)AN 208 has access to the user plane function (UPF) of the LAN (L-UPF 209) via the N3 interface 213. L-UPF 209 has access to the session management function (SMF) of the LAN (L-SMF) 203 via the N4 interface 214. L-UPF 209 has access to data network (DN) 210 via the N6 interface 215. The policy control function (PCF) of the LAN (L-PCF) 201 has access to L-AMF 202 via the N15 interface 219. L-AMF 202 has access to L-SMF 203 via the N11 interface 218. L-SMF 203 has access to the unified data management (UDM) of the LAN (L-UDM 206*a* via the N10 interface 217.

An NEF in the LAN (L-NEF 204) may expose APIs via the Nnef interface 221 that allow an application function (AF) 205 to provision device credentials via a device credential portal 222 in the user data repository (UDR) of the LAN (L-UDR 206*b*). The L-UDR 206*b* is accessed by the L-NEF 204 via the Nudr interface 220. This API may be referred to as the onBoard_Device API and is further described below.

The devices (which in this example may comprise the UE 207 in FIG. 2) may be marked or packaged with identifying-information. The identifying-information may comprise a device identifier (e.g. a permanent equipment identifier (PEI)) and a secret device identifier (SDI). The PEI and SDI may be in well-known formats. As referred to herein, well-known refers values that are standardized in a specification and known to be suitable for connecting to obtain network credentials. The identifying-information may also comprise an indication of the PEI and SDI formats. The identifying-information may also comprise an invitation-request-tag, which is further described below. Identifying-information may also comprise device type, service requirement (e.g. ultra-reliable low latency communication (URLLC)), subscription, security certificates, security keys, etc.

Before a device (e.g., the UE 207) is turned on for the first time and within range of a type-b network, the network operator may use the device credential portal 222 to provide the network with the device's identifying-information. Note that there is an implicit assumption that the network has been provisioned with the device information before the device 207 is tuned on for the first time. For example, the onBoard_Device API that is exposed by the L-NEF 204 may allow the device credential portal 222 (acting as AF 205) to provide the network with the identifying-information of device 27 and a time-to-connect parameter. The time-to-connect parameter may indicate how much time the device 207 is given for connecting to the network or a time window when the device 207 is expected to connect. The onBoard_Device API may also be used to provide the network with geographical-information that is used by the network to derive, or determine, to which RAN node(s) 208 the device 207 is expected to connect first. Alternatively, the geographical-information may include the identities of the candidate RAN nodes 208 that the device 207 is expected to connect to first. Note that the API that is exposed by the L-NEF 204 may also allow the AF 205 to indicate that certain devices or device types are not permitted to access the LAN at a particular time. The L-NEF 204 may distribute this information to the RAN nodes 208 directly or via an L-AMF 202 and the N2 interface 212 of L-AMF 202.

Once the device information is provided to the network via its API and the current time is within the time-to-connect, the network may begin to broadcast invitation-information that the device 207 can use to help it make a determination as to whether to attempt to connect to the network. If the network has the device's geographical-information, it may use this to help determine the specific RAN node(s) 208 in the device's expected geographical area (e.g. tracking area) that should broadcast invitation information. The network's RAN node(s) 208 may broadcast the network's invitation-information comprising a combination of any of the following information:

(1) An indication that the network is willing to accept new devices. The indication may further indicate that the network is willing to accept certain device types or devices that require certain services, certain QoS levels, etc. The indication may be a reserved PLMN identifier. The device may receive an indication that the network is a LAN (e.g., a reserved network identifier) and use this indication to determine whether to request that the RAN node 208 broadcast more information about the network (e.g. whether the network is willing to accept certain device types, devices that require certain services, certain QoS levels).

(2) The PEIs of the devices that the network is willing to allow to connect.

(3) Portions of PEIs of the devices that the network is willing to allow to connect to it.

(4) PEIs or portions of PEIs that are not allowed, or barred, from connecting at the present time The RAN node 208 may broadcast the invitation-information as part of Master Information Block (MIB) or a System Information Block 1 (SIB1) or other System Information indicated by SIB1. Alternatively, the invitation-information may be broadcast by the RAN node 208 as part of a System Information (SI) message(s). When the invitation-information is part of a System Information message(s), the device may send a System Information Request to the RAN node 208 to cause the RAN node 208 to broadcast the System Information message(s) so that the device can receive it. The System Information Request may include an indication that the device 207 wants invitation-information to be broadcasted and/or an invitation-tag. The invitation-tag may be a value that is used to help the RAN node 208 to ensure that it is responding to a device 207 that was invited to connect to the network. For example, the invitation-tag may be an identifier or device type that the device 207 was provisioned with at the time of manufacturing. This indication may also be sent as part of the second message (i.e. the response from the RAN 208) of the initial Random Access procedure via the Random Access Channel (RACH) between the device 207 and the RAN 208. Alternatively, the invitation-tag may be the device identifier (e.g. the PEI of the device 207).

Alternatively, a paging channel may be defined that allows the network to page devices based on their device identifier and the format of their device identifier. The core network (CN) normally only pages devices that are attached/registered. However, in this scenario, the CN knows that that it needs to contact a device 207 based on information that was provided via the portal. When the network is provided with identifying-information for a device 207 and the current time is within the time-to-connect, the network may attempt to page the device 207 in the area that is specified by the geographical-information. The page may be sent to the device 207 via preconfigured paging occasions, i.e. the time and frequency resources and/or the spatial information, although the device 207 has not previously registered with the network. When the device 207, which has not previously registered with the network, blind decodes its paging indication during the time-to-connect window and afterwards receives a paging message that indicates the identifier of the device 207 and the device identifier format, the device 207 may interpret the message as an invitation to connect.

When the device 207 is turned on and network credentials have not been previously provisioned in the device 207 or when the device 207 discovers no network for which it has provisioned credentials, the device 207 may begin to read the Master Information Block (MIB) or System Information Block 1 (SIB1) or other System Information indicated by SIB1 in search of the invitation-information. Alternatively or additionally, device 207 may send a System Information Request to the RAN node in order to cause the RAN to broadcast a System Information message with the invitation-information so that the device 207 can receive the invitation-information. The System Information Request may include the invitation-tag. When the device 207 receives the invitation information and confirms that the invitation includes the identifier of the device 207, the device 207 may request to connect to the network.

Alternatively, upon monitoring the paging channel and observing that the device identifier of the device 207 is being paged at paging allocations that have been pre-configured, the device 207 may attempt to register with the network.

Once the device 207 determines that it wants to connect to the network, the device 207 may send a general registration request to the network. The general registration request may include a PEI. The PEI may be the same identifier that was included in the invitation. The device 207 may not indicate network slice selection assistance information (NSSAI) in this general registration request, or the device 207 may provide an NSSAI that includes a single-NSSAI (S-NSSAI) that includes a well-known slice/service type (SST) or slice differentiator (SD) value that indicates that the device 207 wants to connect to the network and obtain network credentials. The device 207 may provide an indication in the general registration request to indicate that it is registering in response to an invitation and in order to obtain network credentials. The invitation may have been received via the paging channel, a broadcast, or a System Information message. The general registration message may be partially encrypted, and the encryption that is applied may be based, in part, on the SDI. For example, the general registration message may include a device identifier that is not encrypted and then the rest of the general registration message may include information that is encrypted. The encryption may be based on information that is in the SDI. The encrypted information may include a new device identifier for the device 207, information about the location and/or settings of the device 207. The L-AMF 202 may decrypt the message and use the fact that the message has been successfully decrypted to consider the device 207 authorized and authenticated. The general registration response to the device 207, from the L-AMF 202, may also be encrypted and may include new identifier(s) for the device 207 (e.g. a 5G-GUTI). The device 207 may use the new identifier(s) to identify itself in subsequent messages towards the L-AMF 202.

The device 207 may be provisioned with credentials, for example, via the control plane. When the network (i.e. L-AMF 202) receives the registration request, it may authorize the device 207 by confirming that the device identifier was invited to connect and the registration request is being received within the time window. The network may authenticate the device 207 by issuing a challenge value to the device 207. The device 207 may hash the challenge value with the SDI of the device 207 and may respond to the network with the result of the hash operation. The network may consider the device 207 authenticated when the response matches an expected response. The authentication request from the network may indicate what hashing function should be used by the device 207.

Once the network authenticates and authorizes the device 207, the network may provide the device 207 with the following information in the registration accept message:

(1) Locally Unique Temporary Identifier (LUTI) which may be considered unique within the LAN system 200. The LUTI may be treated like a GUTI by the device 207 when the device 207 is within the LAN system 200. However, the device 207 may not use the LUTI when connecting to any other networks.

(2) Local Subscription Identifier (LSI) which may be the subscription identifier of the device 207 with the LAN system 200. It may be treated like a subscription permanent identifier (SUPI) by the device 207 when the device 207 is within the LAN system 200. However, the device 207 may not use the LSI when connecting to any other networks.

(3) Security parameters(s) or certificate(s).

(4) Network identifiers with which the device 207 should register. The credentials are assumed to be associated with all of the provided network identifiers. The network identifiers may comprise, for example, PLMN identifiers, TA-NIDs, TB-NIDs, etc. They may be provided in a prioritized order.

Once the device 207 obtains credentials from an Authentication and Authorization (AA) server or the L-UDM 206a or L-UDR 206b, the device 207 may de-register and may perform a new general registration using the credentials.

FIG. 3 is a diagram of an example procedure 300 for device onboarding to a type-b network in accordance with one example, which may be used in combination with any of the embodiments described herein. The example procedure 300 of FIG. 3, demonstrates a device being provisioned with type-b network credentials.

Referring to FIG. 3, the onBoard_Device API, as described above, may be used by AF 307 to provision device credentials in the network via an onboard_Device_Request (step 311). The API may be used to provision the L-UDR 305 with information for one or more devices, including but not limited to the following: identifying-information, time-to-connect, and geographical information The L-NEF 306 may use an L-UDR service, such as the Nudr_DM_Create service, to provision the device credentials in the L-UDR 305 (step 312). At this time, the L-NEF 306 may distribute information to the AMF's in the network so that the AMF's can inform the RAN nodes what types of devices, or what device identities, are allowed to attach to the network and the RAN nodes know what information should be broadcasted.

The L-UDR 305 may reply to the invocation of the Nudr_DM_Create service to L-NEF 306 with a provision credential response indicating whether or not provisioning was successful (step 313).

The L-NEF 306 may reply to the invocation of the onBoard_Device service (via the onboard_Device_Request) with an onboard_Device response indicating whether or not provisioning was successful (step 314).

An initiating event on UE 301 (which may be any of the devices described herein) causes the UE 301 to begin to attempt to connect to network without any pre-provisioned network credentials (step 315). An example of an initiating event is the UE 301 powering on, the UE 301 being powered on and off in a certain sequence, human interaction with a user interface such as a button or GUI, or UE 301 discovering no network for which it already had provisioned network credentials.

The UE 301 may begin reading MIB or SIB1 or other System Information indicated by SIB1 that is broadcast from the (R)AN node 302 (step 316). The UE 301 may be pre-provisioned to search for some default information in the SIB or MIB information. For example, UE 301 may search for an indication that the network provides certain types of services. In another example, the UE 301 may search for an indication that the network is able to provision devices with network credentials. The UE 301 may also search for an indication that the network can accept certain types of System Information Requests (e.g. a system information request for the network to broadcast invitation information). The UE 301 may search for a RAN node that is broadcasting the PEI of the UE 301 or portion of the PEI of the UE 301. Alternatively, the UE 301 may search for a RAN node that is paging the PEI of UE 301.

The UE 301 may send a System Information Request to the network via (R)AN 302 (step 317). The system information request may include the identifying information of UE 301 or an invitation-tag. The system information request is a request for the network to broadcast information including but not limited to:

an indication that the network provides certain types of services;
an indication that the network is able to provision devices with network credentials;
PEIs of devices that it is inviting to connect or any device that is associated with the provided invitation-tag; and
an indication that the network is able to invite devices to connect via paging.

The network may broadcast the requested information via (R)AN 302 (step 318).

The UE 301 may sends a general registration request to L-AMF 303 (step 319). The request may include the PEI and/or may include the SDI.

The L-AMF 303 may invoke the Nudm_SDM_Get service to retrieve, via L-UDM 304 and L-UDR 305, the device credentials that were provided in step 311 by the onBoard_Device API (steps 320a, 320b, and 320c).

The L-AMF 303 may check that the device identifier was invited to connect and the registration request is being received within the time window, and the L-AMF 303 may then authenticate and authorize the UE 301 (step 321) by issuing a challenge value to the UE 301 and checking the response matches what is expected based on the SDI of UE 301. As described above, if the UE 301 encrypted part of the general registration message, the L-AMF 303 may use the fact that the L-AMF 303 can decrypt the message as justification for authenticating and authorizing the UE 301. Thus, this step may require no interaction with the UE 301.

Provided that the UE 301 has been authenticated and authorized, the network may send a registration accept message to the UE 301 (step 322). The network may provide the device with information in the registration accept message including but not limited to the following:

(1) LUTI.
(2) LSI.
(3) Security parameter(s) and certificate(s).
(4) Network identifier. The network identifier may not need to be provided to the UE 301 in the registration accept message because the UE 301 may obtain it from an MIB. Upon receiving network credentials, the UE 301 may store the network credentials and network identifier for future attempts to connect the network.
(5) Other information that may assist the UE 301 in discovering the LAN network such as:
  (a) Operating parameters of the LAN network. For example, the downlink frequency, bandwidth, etc.
  (b) The geographic location of the RAN nodes providing service to the LAN network
  (c) Access restrictions of the LAN network. For example, the LAN network may only provide service during regular business hours: from 8 AM to 5 PM.

The UE 301 may send a registration complete message to the network indicating that the credentials have been successfully provisioned (step 323). The registration complete message may include an indication that the UE 301 is going to de-register and reregister with the network with the credentials that were just provisioned.

Alternatively, UE 301 may be provisioned with credentials via the user plane. For example, when the network (L-AMF 303) receives the registration request in step 319, it may authorize the UE 301 to access only a default S-NSSAI that is used to obtain access to an AA Server. The registration accept message from the L-AMF 303 that is sent during sent during step 322 may provide the UE 301 with the S-NSSAI. The UE 301 may then connect to the AA server and obtain the same information sent in the registration accept message of step 322 as described above (e.g. LUTI, LSI, security key(s), certificate(s) and network identifiers). Once the UE 301 obtains credentials from the AA server, the UE 301 may de-register and perform a new general registration using the credentials.

Devices may perform LAN discovery in accordance with another example, which may be used in combination with any of the embodiments described herein. A device may discover LANs for which it already has network credentials and information provisioned. In convention systems, devices discover networks by receiving a network ID (PLMN-ID) which is broadcast by the RAN node. This approach is not always suitable for LANs, and it may not be desirable for the LAN to always broadcast its network identifier.

Alternatively, the LAN RAN node may broadcast partial identifying information about itself. Examples of partial identifying information may comprise a network identifier (e.g. an MCC and MNC), a network type indication (e.g. safety, industrial, private, home, vehicular, edge computing, etc.), etc.

When the device is searching for a network to connect to, it may receive the partial identifying information that is being broadcast by the RAN node and, if the partial identifying information corresponds to a network that it desires to connect, it may decide to check further in order to determine whether it should try to connect. Examples of partial identifying information may comprise any combination of MCC, MNC, service identifiers, operator identifiers, network identifiers, a number, etc.

When a device wants to further check the network's identifier, it may send a system information request that includes an indication that it wants the RAN node to broadcast a system information message with more details about the network. The additional details may be a complete network identifier or parts of a network identifier, which may form a complete network identifier when they are combined with the information that was already received in the MIBs or SIBs. The request from the UE to the RAN node may include information that was previously provisioned in the UE by the network such as an invitation-tag.

FIG. 4 is a diagram of an example procedure 400 for network discovery in accordance with an example, which may be used in combination with any of the embodiments described herein. The procedure of FIG. 4 describes how steps 315-318 of FIG. 3 may be performed.

Referring to FIG. 4, the device may begin to search for a network (step 410). The initiating event, or trigger, that causes the device to begin searching for the network may be an indication from a user interface (e.g. a button or GUI) a change of location, the UE entering a particular location, losing connectivity with a network, etc.

The device may detect a nearby network and based on a condition such as signal strength may decides to begin the process of determining whether the device is supposed to connect to the network (step 411).

The device may receives broadcast information from the network and determines that the network might be a network with which it wants to associate (step 412). For example, the device may determine that the associated network operator is a network operator with which the device wants to associate. If the broadcast information does not indicate a network operator with which the device wants to associate, then the device will revert to step 411. The device may further check other MIB or SIB information to determine what services the network offers, what types of devices should connect to the network, and/or if the network is willing to respond to system information requests for more details about what services it offers.

The device may send a system information request to the network to enquire if the network supports particular services, devices, etc. (step 413). The request may also be an indication or request that the network should broadcast more identifying information about the network. The request may include an invitation tag or identifying information for the device so that the RAN node can determine whether the device should receive the additional information.

The may network begin to broadcast and the device may begin to receive and analyze more information about the network (step 414). For example, the network may broadcast more identifying information about the network, information about what services it offers, and what kinds of devices it can support. If the device determines that it does not want to associate with the network, the device will revert to step 411.

The device sends a registration request to the network (step 415).

Alternatively, when a device discovers a RAN node that is broadcasting a PLMN identifier with the same MCC and MNC as a LAN to which it wants to connect, the UE may register with the PLMN (via the general registration request of step 319 in FIG. 3), and the PLMN may provide the device with the additional details of the LANs that can be reached via the same RAN node (via the general registration request of step 319 in FIG. 3). The LAN information that is provided to the UE may depend on the subscription information of the device. When the device obtains the additional information, it may then register with the LAN. The device may choose to re-register with the PLMN before registering with the LAN. The PLMN may indicate to the UE whether it should de-register prior to connecting to the LAN. The LAN information may be delivered to the device by the AMF in the NAS general registration accept message of step 322 in FIG. 3. Alternatively, the information may be delivered to the UE by the RAN in an RRC message. When the RAN node provides the information to the device, the AMF may first provide the RAN node with information associated with LANs to which the device is permitted to connect.

Before a device registers with a LAN, it may want to check if the LAN offers particular services. A RAN node may broadcast, in the MOB or SIBs an indication that it supports certain services, or an indication that when asked, it can broadcast indications that it supports particular services. The device may then send a system information request to the RAN node in order to cause the RAN to broadcast a system information message that indicates what services can be reached via the network. The device can then base its decision on whether or not to connect on the response from the RAN node.

A device may connect to two AMFs via the same RAN node in accordance with another example, which may be used in combination with any of the embodiments described herein. A single RAN node may be used by a device to reach both the 3GPP wide area cellular network and a 3GPP LAN. In such a scenario, the wide area cellular network and LAN may be served by different AMFs. In such a scenario, when the device is already connected to the LAN or PLMN and attempting to register to the other network, the device may indicate to the RAN node that the registration request is a new registration request for the other network.

When the device attempts to register with the other of the wide area cellular network or LAN, the device may provide an indication to the RAN that the request is for a new NAS connection and that the existing NAS connection should not be torn down. For example, the AN Parameters field of the Registration request may include an indication to the RAN that the request is for a new NAS connection and that the existing connection should not be torn down. The AN Parameters field may also indicate the wide area cellular network or LAN to which the device is attempting to register. The 5G-GUTI or SUCI that is provided to the RAN in the AN Parameters field may be a 5G-GUTI or SUCI that is associated with the wide area network or LAN to which the UE is attempting to connect.

The LAN operator may have policies, or rules, associated with each user or group. The polices may be used to determine what other devices may be discovered by the user or group. When the LAN receives a discovery request, the network may check if the device is permitted to discover the types of devices that are indicated in the request, however, it would be more efficient if the device knew, in advance, what type of devices it is allowed to discover in order to prevent it from issuing requests that will be denied. Thus, a LAN may include a PCF and that the PCF may send discovery polices to the UE in accordance with another example, which may be used in combination with any of the embodiments described herein. The discovery policies may detail what types of the devices may be discovered, what device groups may be discovered, and what device identifiers may be discovered. The polices may further indicate that certain devices or services are discoverable but the device may not be allowed to communicate with it without executing an additional request and authorization procedure with the network. The UE Configuration Update procedure for transparent UE policy delivery may be used to deliver the polices to the UE.

Once the discovery policies are provided to the device, the device may display the policy information on a GUI so that the user of the device can browse what devices, types of devices, or groups of devices it may be allowed to discover.

Once discovery polices are received, the UE may trigger a discovery request based on user input (e.g., from a GUI), based on reception of the policies, or based on an application request. The discovery request may include an indication of what is to be discovered (e.g. devices, device types, groups of devices, etc.). The network may respond with a list of available devices.

When the device selects a discovered device to communicate with, the device may attempt to initiate communication with the device by contacting the discovered device directly based on the information that was provided in the discovery response. Alternatively, the device may send a control plane message to the network asking that a trigger be sent to the device. The trigger may contain information for how the discovered device may contact the device.

As discussed above, PDN connections may need to be moved from a LAN to a PLMN or vice versa. For example, a device may have two PDN connections. The first PDN connection may be used to carry traffic, for example from sensors that are in the car, and the second PDN connection may be used to carry traffic, for example that is used for streaming audio and video. When the vehicle arrives at a factory, the first PDN connection that is associated with the sensor data may need to be moved to the LAN while the second PDN connection may stay connected to the PLMN.

This type of handover, where some PDU Sessions are handed over and some are not, is not currently supported in the inter NG-RAN node N2 based handover procedure of conventional systems. In the Inter NG-RAN node N2 based handover procedure of conventional systems, all PDU Sessions (i.e. all existing PDU Sessions with active UP connections) are handed over from the source RAN (S-RAN) to the target RAN (T-RAN). When a device moves towards, or away from a LAN, only certain PDU sessions should be moved. In order to support moving only selected PDU sessions between an S-RAN and T-RAN, the following enhancements to the handover procedure are described herein.

The S-RAN may determine that only certain PDU sessions are candidates to be handed over to a particular T-RAN based on any of the following:

When a UE reports measurements to the S-RAN and the measurements relate to a T-RAN, i.e. a LAN, that should only support some of the UE's PDU Sessions, the UE may report to the S-RAN that the T-RAN is a LAN network and may only support handover of certain PDU Sessions. The UE may further indicate which PDU sessions may be moved to the T-RAN and which PDU sessions may not be moved to the T-RAN. The UE may know, based on SM policies that were received from the PCF, which LANs and T-RAN identifiers to which a PDU Session may be handed over.

When a PDU Session is established, the SMF may report to the (R)AN node (via the AMF), in the N2 SM Information that the PDU session is allowed to be handed over to a T-RAN that is a LAN Network. Additionally, the N2 SM Information may report the identities of the LAN(s) and associated T-RAN(s) to which the PDU Session may be transferred.

Enhancements to the Handover Required message are also described herein. The Handover Required message from the S-RAN to the S-AMF may be enhanced to indicate to the S-AMF that only certain PDU Sessions should be handed over (along with the PDU Sessions IDs that should be handed over).

The UE may be aware, based on SM polices that were provided by the PCF, that certain PDU sessions may be moved to a LAN. The polices may further indicate if a PDU session should be handed over to particular LANs when possible or should never be handed over to a wide area network (e.g. a PLMN). The UE may provide the associated PDU Session IDs to the RAN so that the RAN can use this information when making a determination of whether or not to handover a UE to a target RAN. The RAN may also use this information to determine whether to handover certain PDU sessions and terminate PDU sessions that are not eligible to be moved to the target RAN. The PDU sessions to terminate may be indicated in the handover message to the T-RAN. The UE may also indicate that a PDU Session should only be associated with a particular LAN when the PDU Session is established. The SMF may then provide this information to the RAN node in the N2 SM Information.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 5A:
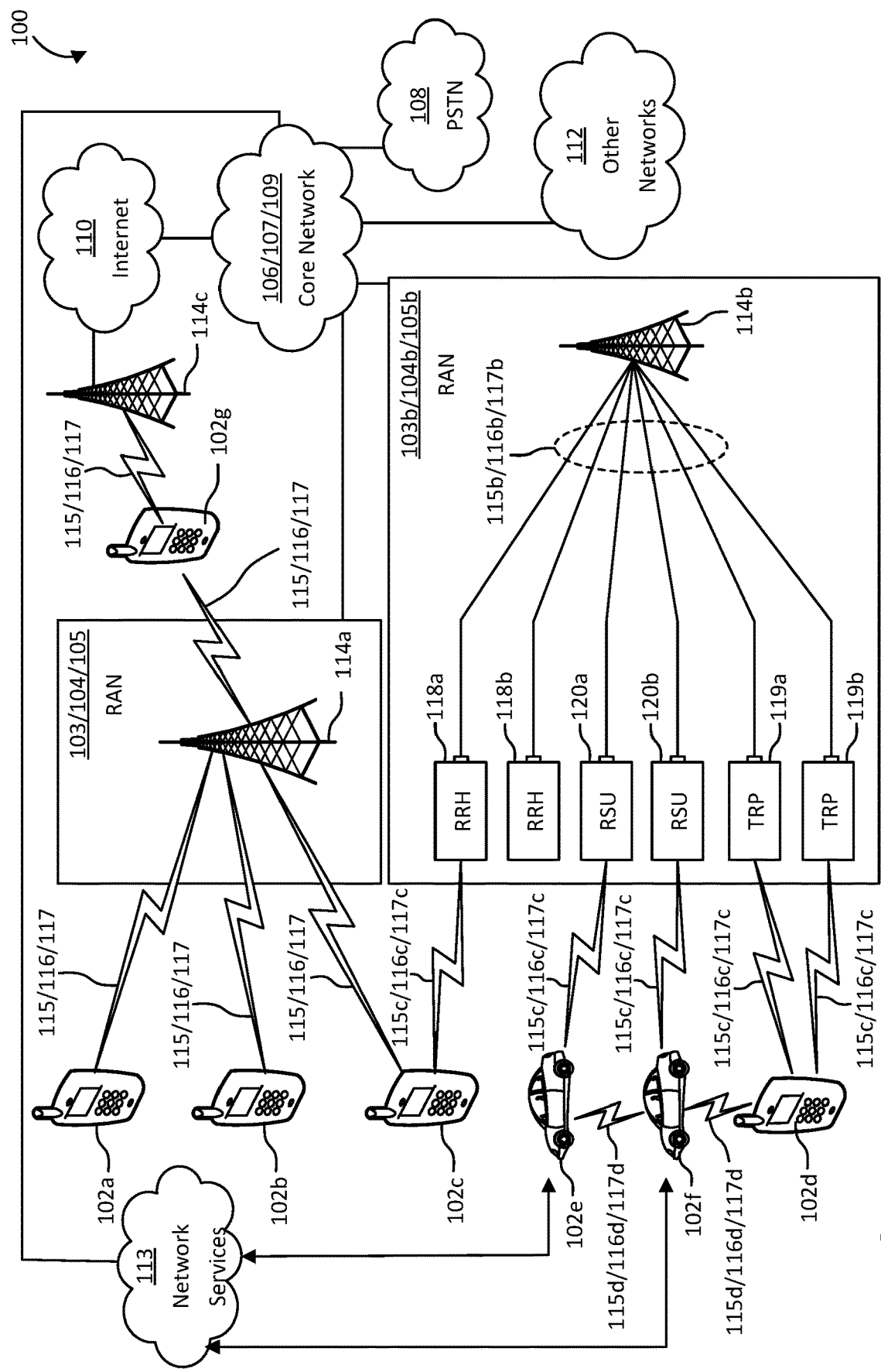
FIG. 5A illustrates an example communications system.

FIG. 5A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 5A, each of the WTRUs 102 is depicted in FIGS. 5A-5E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 5A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118*b*, TRPS 119*a* and 119*b*, and/or RSUs 120*a* and 120*b* in the RAN 103*b*/104*b*/105*b* and the WTRUs 102*c*, 102*d*, 102*e*, and 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 5A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114*c* and the WTRUs 102, e.g., WTRU 102*e*, may implement a radio technology such as IEEE 802.11 to establish a Wireless Local Area Network (WLAN). Similarly, the base station 114*c* and the WTRUs 102, e.g., WTRU 102*d*, may implement a radio technology such as IEEE 802.15 to establish a wireless personal area network (WPAN). The base station 114*c* and the WTRUs 102, e.g., WRTU 102*e*, may utilize a cellular-based RAT (e.g., WCDMA, CDMA2000, GSM, LTE, LTE-A, NR, etc.) to establish a picocell or femtocell. As shown in FIG. 5A, the base station 114*c* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 5A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*e*, and 102*f* may include multiple transceivers for communicating with different wireless networks over different wireless links. For example, the WTRU 102*g* shown in FIG. 5A may be configured to communicate with the base station 114*a*, which may employ a cellular-based radio technology, and with the base station 114*c*, which may employ an IEEE 802 radio technology.

Although not shown in FIG. 5A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115*c*/116*c*/117*c* may equally apply to a wired connection.

Figure 5B:
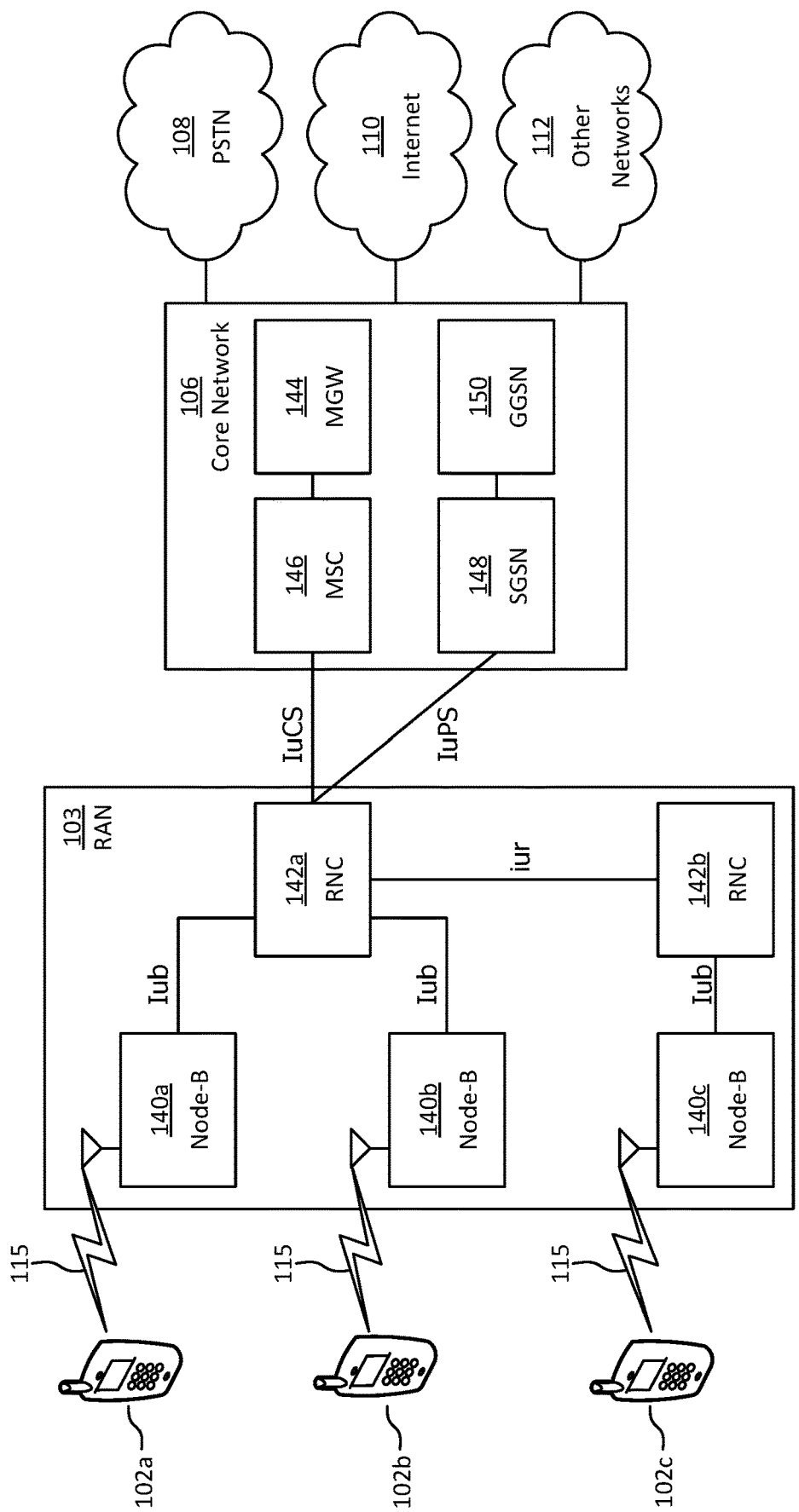
FIG. 5B is a system diagram of an example RAN and core network.

FIG. 5B is a system diagram of an example RAN 103 and core network 106. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 5B, the RAN 103 may include Node-Bs 140*a*, 140*b*, and 140*c*, which may each include one or more transceivers for communicating with the WTRUs 102*a*, 102*b*, and 102*c* over the air interface 115. The Node-Bs 140*a*, 140*b*, and 140*c* may each be associated with a particular cell (not shown) within the RAN 103. The RAN 103 may also include RNCs 142*a*, 142*b*. It will be appreciated that the RAN 103 may include any number of Node-Bs and Radio Network Controllers (RNCs.)

As shown in FIG. 5B, the Node-Bs 140*a*, 140*b* may be in communication with the RNC 142*a*. Additionally, the Node-B 140*c* may be in communication with the RNC 142*b*. The Node-Bs 140*a*, 140*b*, and 140*c* may communicate with the respective RNCs 142*a* and 142*b* via an Iub interface. The RNCs 142*a* and 142*b* may be in communication with one another via an Iur interface. Each of the RNCs 142*a* and 142*b* may be configured to control the respective Node-Bs 140*a*, 140*b*, and 140*c* to which it is connected. In addition, each of the RNCs 142*a* and 142*b* may be configured to carry out or support other functionality, such as outer loop power control, load control, admission control, packet scheduling, handover control, macro-diversity, security functions, data encryption, and the like.

The core network 106 shown in FIG. 5B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, and 102*c* with access to circuit-switched networks, such as the PSTN 108, to facilitate communications between the WTRUs 102*a*, 102*b*, and 102*c*, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 5C:
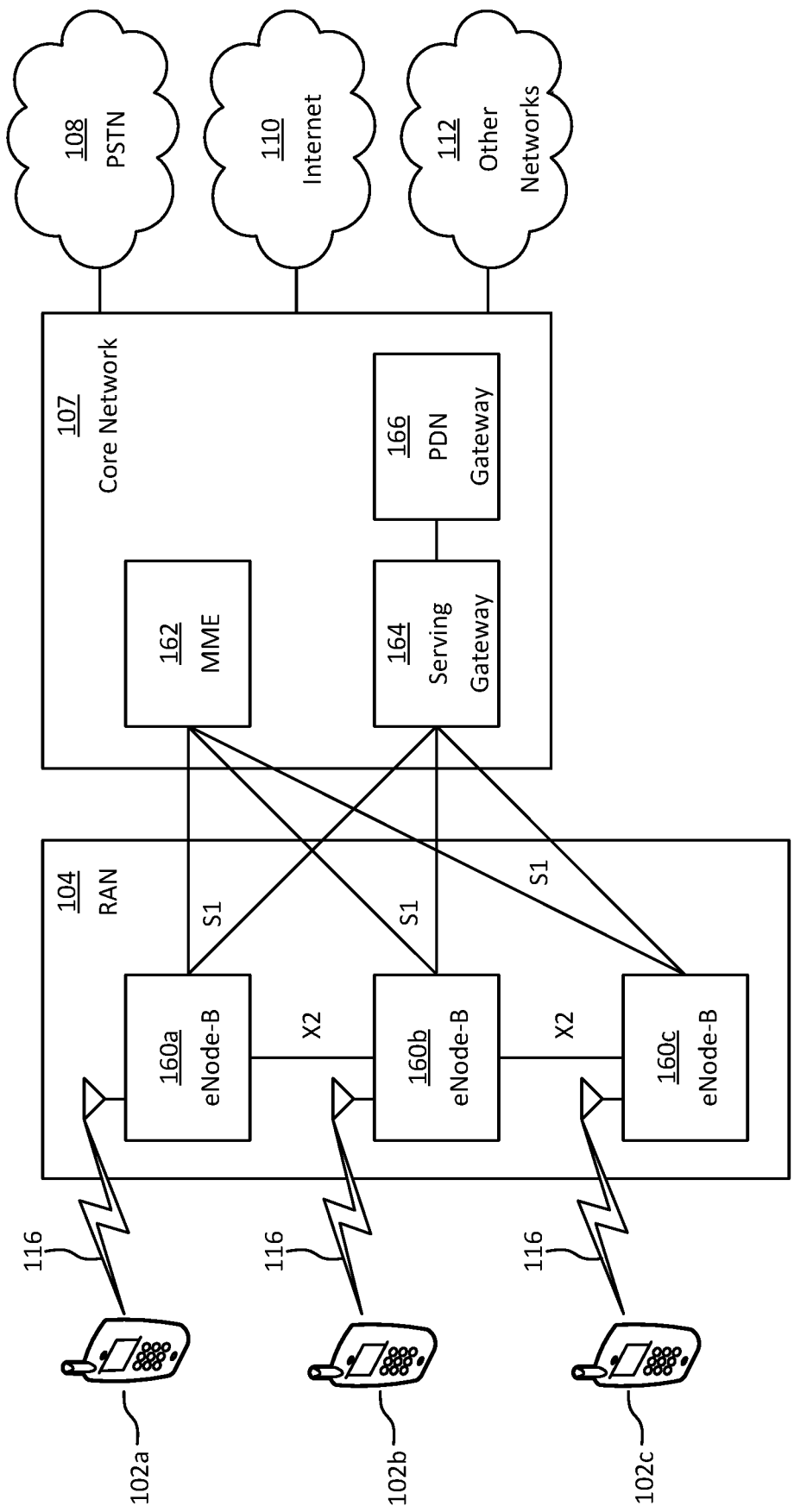
FIG. 5C is a system diagram of an example RAN and core network.

FIG. 5C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 5C, the eNode-Bs 160a, 160b, and 160c may communicate with one another over an X2 interface.

The core network 107 shown in FIG. 5C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 5D:
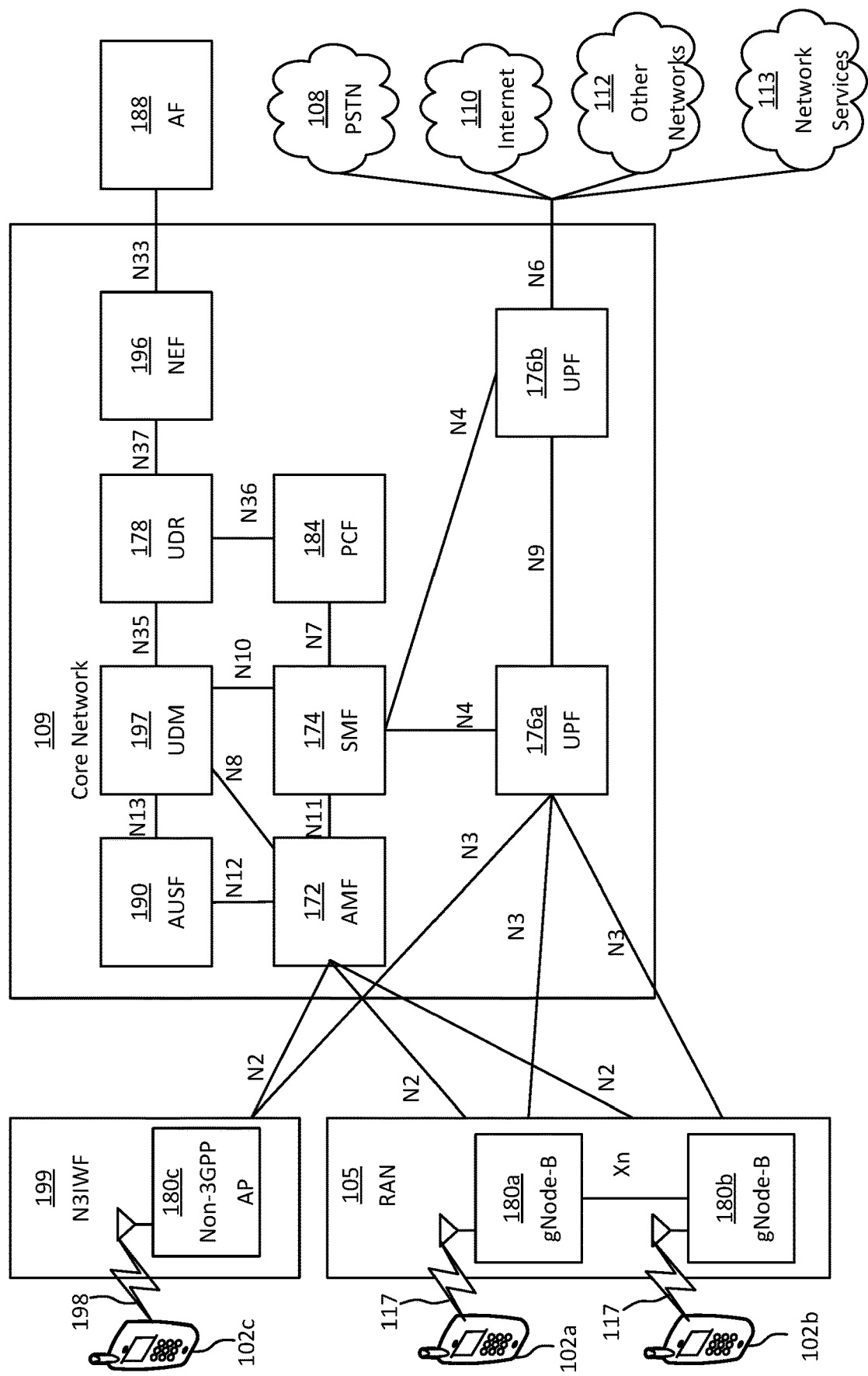
FIG. 5D is a system diagram of an example RAN and core network.

FIG. 5D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 5D, the gNode-Bs 180a and 180b may communicate with one another over an Xn interface, for example.

The core network 109 shown in FIG. 5D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 5G.

In the example of FIG. 5D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 5D shows that network functions directly connect to one another, however, it should be appreciated that they may communicate via routing agents such as a diameter routing agent or message buses.

In the example of FIG. 5D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 5D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 5D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 5D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 5A, 5C, 5D, and 5E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 5A, 5B, 5C, 5D, and 5E are provided by way of example only, and it is understood that the subject matter disclosed and claimed herein may be embodied or implemented in any similar communication system, whether presently defined or defined in the future.

Figure 5E:
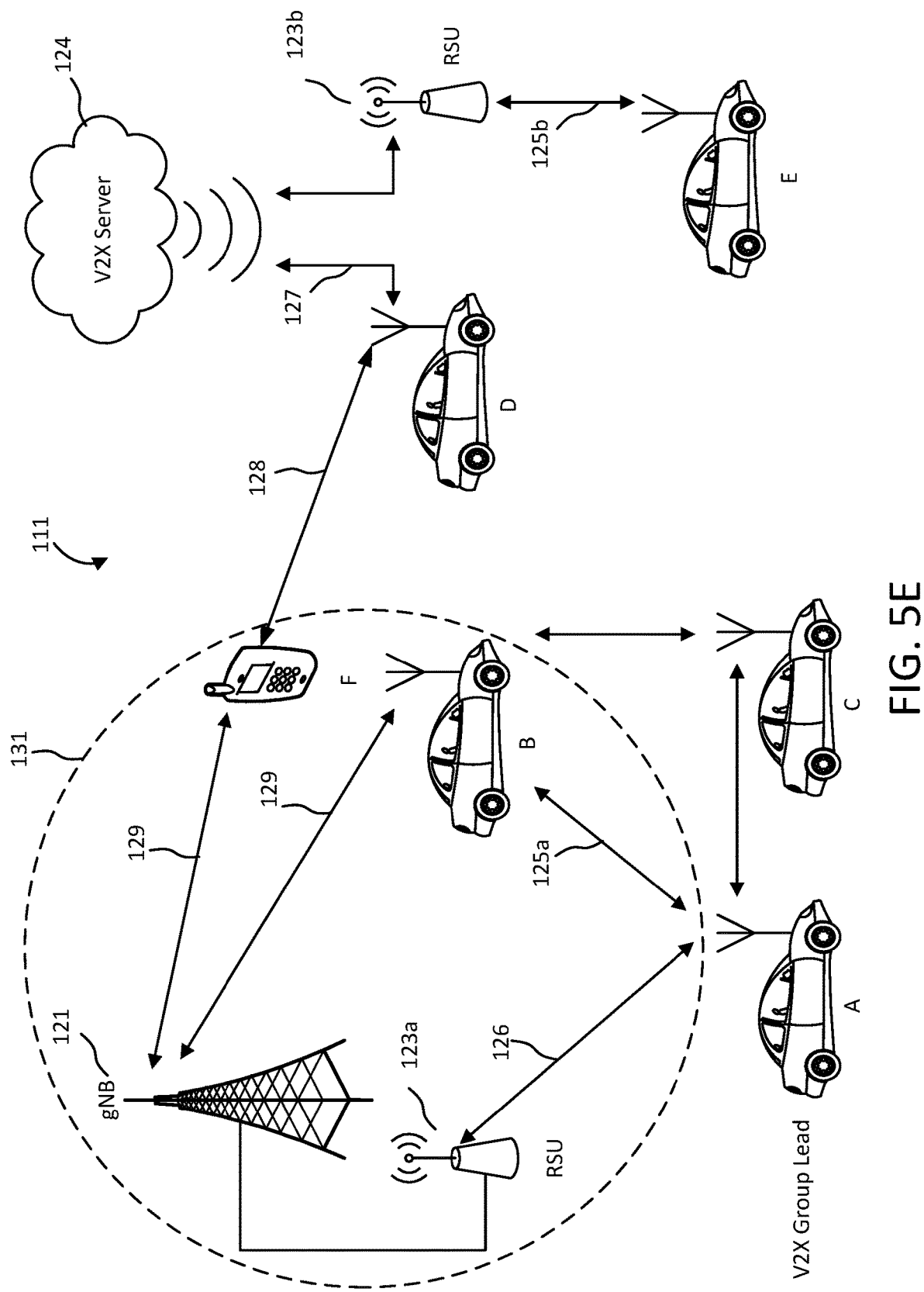
FIG. 5E illustrates another example communications system.

FIG. 5E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 5E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 5E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 5F:
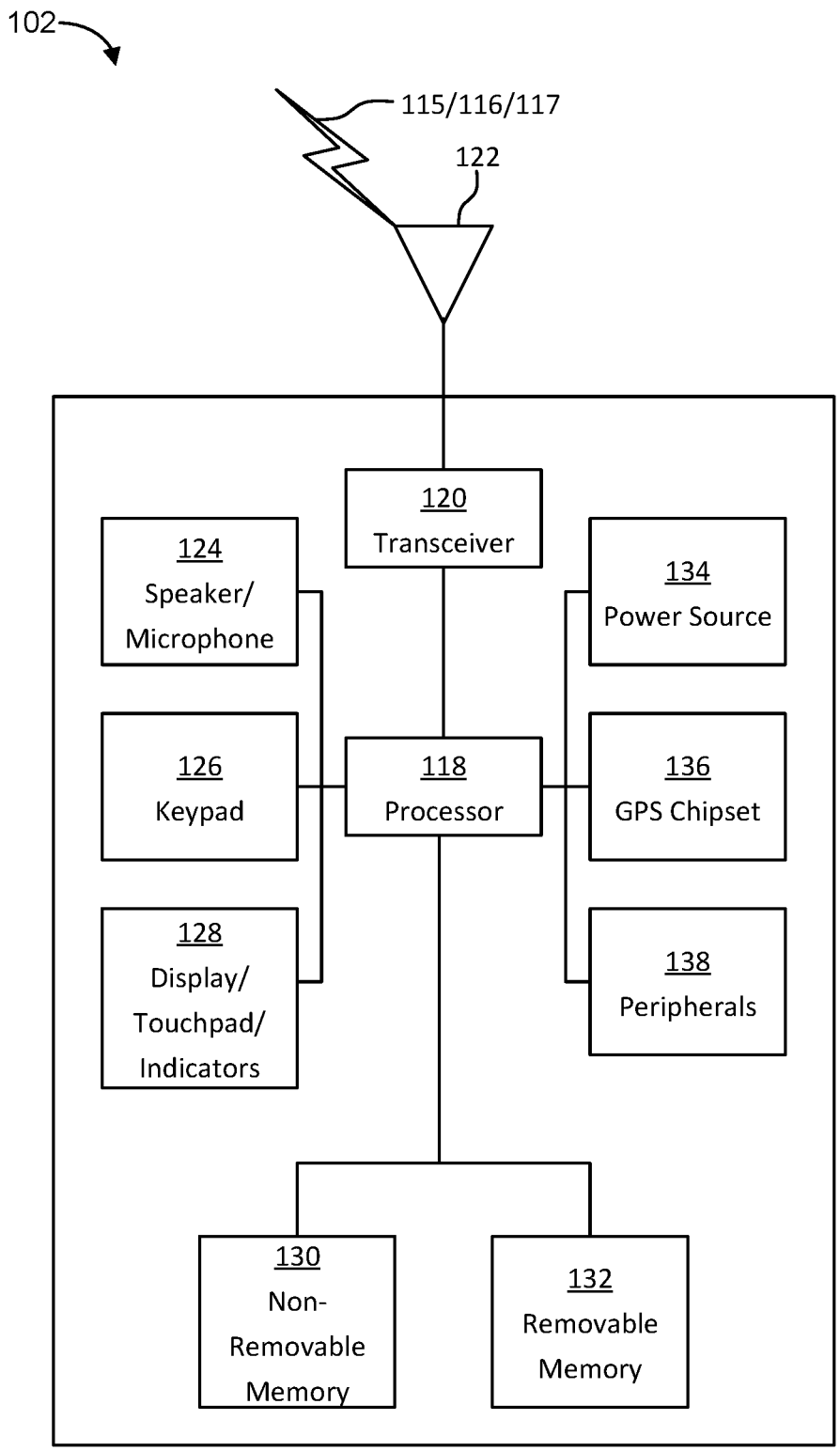
FIG. 5F is a block diagram of an example apparatus or device, such as a wireless transmit/receive unit (WTRU)

FIG. 5F is a block diagram of an example apparatus or device WTRU 102 that may be configured for wireless communications and operations in accordance with the systems, methods, and apparatuses described herein, such as a WTRU 102 of FIG. 5A, 5B, 5C, 5D, or 5E. As shown in FIG. 5F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 5F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 5F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 5A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 5F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 5G:
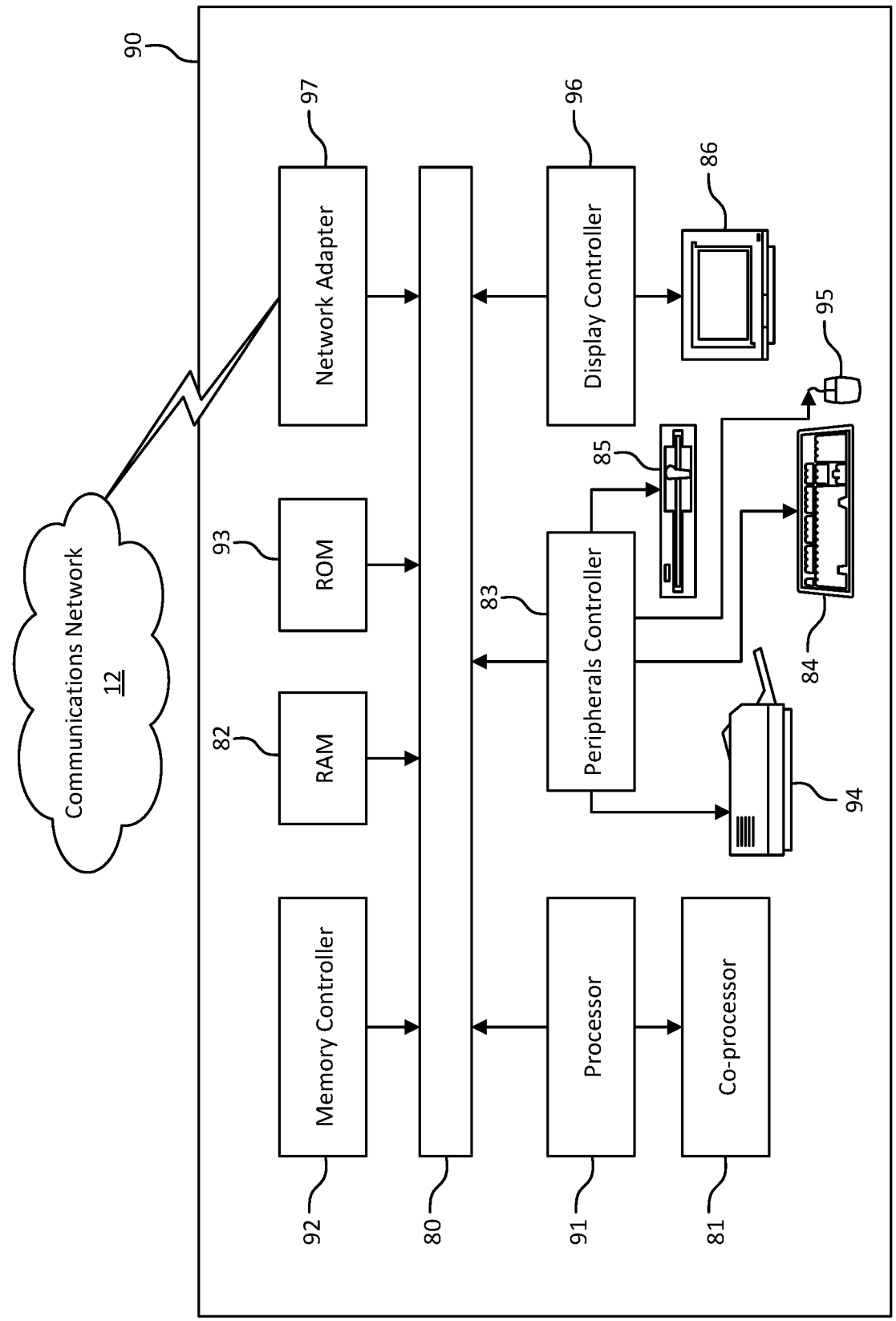
FIG. 5G is a block diagram of an exemplary computing system.

FIG. 5G is a block diagram of an exemplary computing system 90 in which one or more apparatuses of the communications networks illustrated in FIGS. 5A, 5C, 5D and 5E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 5A, 5B, 5C, 5D, and 5E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed:

1. A wireless transmit/receive unit (WTRU), comprising a transceiver and one or more processors, configured to:
   provision the WTRU with identifying information;
   receive, from a network, a first broadcast message comprising a first indication that the network can provision devices with one or more network credentials;
   send, to the network and based on the first broadcast message, a registration request that comprises the identifying information previously provisioned to the WTRU and a second indication the WTRU is registering in response to the first indication to obtain the network credentials;
   receive a second broadcast message from the network, wherein the second broadcast message includes a network identifier indicating that the network can provision the WTRU with the one or more network credentials, and
   perform a registration procedure with the network, wherein the registration procedure with the network is performed based on the first broadcast message and the second broadcast message;
   receive the one or more network credentials;
   perform a de-registration procedure with the network; and
   perform, using the one or more network credentials, a second registration procedure.

2. The WTRU of claim 1, further configured to:
   determine, based on the first broadcast message, to request the second broadcast message, and
   send a system information request to the network for the second broadcast message.

3. The WTRU of claim 1, wherein the one or more network credentials include at least one of:
   a network identifier,
   a subscription identifier,
   a security parameters or security certificates, or location information.

4. The WTRU of claim 1, wherein being configured to send the registration request comprises being configured to send the registration request based on an event comprising at least one of:
   the WTRU powering on,
   the WTRU being powered on and off in a sequence,
   receiving an indication from a user interface such as a button or a graphical user interface (GUI),
   the WTRU discovering no network for which it already has provisioned the one or more network credentials, or
   a change to a location of the WTRU.

5. The WTRU of claim 1, wherein the one or more network credentials are received in a non-access stratum (NAS) message.

6. The WTRU of claim 1, wherein the one or more network credentials are received in a user plane procedure with a server.

7. The WTRU of claim 4, wherein the registration procedure further comprises:
   receiving a single-network slice selection assistance information (S-NSSAI) from the network, and
   using the S-NSSAI to connect to the server.

8. The WTRU of claim 1, wherein the WTRU comprises a user equipment (UE).

9. A method implemented in a wireless transmit/receive unit (WTRU), the method comprising:
   causing provisioning of the WTRU with identifying information;

receiving, from a network, a first broadcast message comprising a first indication that the network can provision devices with one or more network credentials;

sending, to the network and based on the first broadcast message, a registration request that comprises the identifying information previously provisioned in the WTRU and a second indication the WTRU is registering in response to the first indication to obtain the one or more network credentials;

receiving, a second broadcast message from the network, wherein the second broadcast message includes a network identifier indicating that the network can provision the WTRU with the one or more network credentials, and performing a registration procedure with the network, wherein performing the registration procedure with the network is based on the first broadcast massage and the second broadcast message;

receiving the one or more network credentials;

performing a de-registration procedure with the network; and performing, using the one or more network credentials, a second registration procedure.

10. The method of claim 9, comprising:

determining, based on the first broadcast message, to request the second broadcast message, and sending a system information request to the network for the second broadcast message.

11. The method of claim 9, wherein the one or more network credentials include at least one of:

a network identifier, a subscription identifier, a security parameters or security certificates, or location information.

12. The method of claim 9, wherein sending the registration request is based on an event that causes the apparatus to initiate the operations, and wherein the event comprises at least one of:

the WTRU powering on, the WTRU being powered on and off in a sequence, receiving an indication from a user interface such as a button or a graphical user interface (GUI), the WTRU discovering no network for which it already has provisioned the network credentials, or a change to a location of the WTRU.

* * * * *